United States Patent
Wu et al.

(10) Patent No.: US 12,229,401 B2
(45) Date of Patent: Feb. 18, 2025

(54) SYSTEMS AND METHODS FOR HAND-DRAWN GRAPHIC DETERMINATION

(71) Applicant: ZHEJIANG DAHUA TECHNOLOGY CO., LTD., Zhejiang (CN)

(72) Inventors: Jiacheng Wu, Hangzhou (CN); Wenxiong Xu, Hangzhou (CN); Jianping Xiong, Hangzhou (CN); Yuanyuan Chen, Hangzhou (CN); Ying Cao, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/593,837

(22) Filed: Mar. 1, 2024

(65) Prior Publication Data
US 2024/0211127 A1    Jun. 27, 2024

Related U.S. Application Data

(63) Continuation of application No. PCT/CN2021/135739, filed on Dec. 6, 2021.

(30) Foreign Application Priority Data

Sep. 1, 2021 (CN) .......................... 202111022297.8

(51) Int. Cl.
 *G06F 3/04883* (2022.01)
 *G06T 11/20* (2006.01)
(52) U.S. Cl.
 CPC ........ *G06F 3/04883* (2013.01); *G06T 11/203* (2013.01)

(58) Field of Classification Search
 CPC .......................... G06F 3/04883; G06T 11/203
 USPC ................................................... 345/173, 174
 See application file for complete search history.

(56) References Cited

U.S. PATENT DOCUMENTS

| | | | |
|---|---|---|---|
| 2002/0141643 | A1 | 10/2002 | Jaeger |
| 2002/0150297 | A1 | 10/2002 | Gorbatov et al. |
| 2005/0063592 | A1 | 3/2005 | Li et al. |
| 2009/0207174 | A1 | 8/2009 | Chen |
| 2014/0123079 | A1 | 5/2014 | Wu |

(Continued)

FOREIGN PATENT DOCUMENTS

| | | |
|---|---|---|
| CN | 101593270 A | 12/2009 |
| CN | 101799937 A | 8/2010 |

(Continued)

OTHER PUBLICATIONS

International Search Report in PCT/CN2021/135739 mailed on Jun. 6, 2022, 5 pages.

(Continued)

*Primary Examiner* — Calvin C Ma
(74) *Attorney, Agent, or Firm* — METIS IP LLC

(57) ABSTRACT

A system (100) and method for determining a hand-drawn graphic are provided. The method may include obtaining one or more hand-drawn strokes inputted into a drawing region (310), and in response to determining that an input termination condition is satisfied, determining a hand-drawn graphic corresponding to the one or more hand-drawn strokes (320).

20 Claims, 6 Drawing Sheets

(56) References Cited

U.S. PATENT DOCUMENTS

| | | | | |
|---|---|---|---|---|
| 2014/0368455 | A1* | 12/2014 | Croisonnier | G06F 3/045 345/173 |
| 2016/0328624 | A1 | 11/2016 | Angelov et al. | |
| 2018/0060689 | A1* | 3/2018 | Sklaroff | G06V 30/1423 |
| 2020/0005510 | A1 | 1/2020 | Thimbleby et al. | |
| 2021/0303087 | A1* | 9/2021 | Vanka | G06F 3/0487 |

FOREIGN PATENT DOCUMENTS

| | | |
|---|---|---|
| CN | 101393648 B | 6/2011 |
| CN | 103400109 A | 11/2013 |
| CN | 105719328 A | 6/2016 |
| CN | 112102435 A | 12/2020 |
| CN | 112489167 A | 3/2021 |
| CN | 112990183 A | 6/2021 |
| CN | 113240018 A | 8/2021 |
| JP | H0877299 A | 3/1996 |

OTHER PUBLICATIONS

Written Opinion in PCT/CN2021/135739 mailed on Jun. 6, 2022, 4 pages.

Chang, Xinli, Research on Hand-drawing Geometrics Recognition, Master's thesis of Wuhan University of Technology, 2009, 71 pages.

Chang, Xinli et al., Geometric Sketching Recognition Based on Graphics Unit, Computer & Digital Engineering, 36(12): 138-141, 2008.

Zhang, Xiwen et al., Extraction of Line Segments and Circular Arcs From Freehand Strokes Based on Segmental Homogeneity Features, IEEE Transactions On Systems, Man, and Cybernetics—Part B: Cybernetics, 36(2): 300-311, 2006.

* cited by examiner

300

```
Obtaining, through a user interface implemented
on a smart drawing board, one or more hand-
drawn strokes inputted by a user and represented      ~310
in a drawing region of the user interface
```

↓

```
In response to determining that an input
termination condition is satisfied, determining a     ~320
hand-drawn graphic corresponding to the one or
more hand-drawn strokes
```

FIG. 3

SYSTEMS AND METHODS FOR HAND-DRAWN GRAPHIC DETERMINATION

CROSS-REFERENCE TO RELATED APPLICATIONS

This application is a continuation of International Application No. PCT/CN2021/135739, filed on Dec. 6, 2021, which claims priority of Chinese Patent Application No. 202111022297.8, filed on Sep. 1, 2021, the contents of each of which are hereby incorporated by reference in its entirety.

TECHNICAL FIELD

The disclosure generally relates to smart electronic field, and more particularly, relates to systems and methods for hand-drawn graphic determination.

BACKGROUND

With the development of science and technology, intelligent office is more and more popular. For example, people can draw hand-drawn graphics on a smart whiteboard for communication and/or display during office work. Generally, graphics drawn by users on the smart whiteboard may be not standardized, resulting in low accuracy of hand-drawn graphics recognition. Therefore, it is desired to provide systems and methods for determining hand-drawn graphics to improve the accuracy and robustness of hand-drawn graphics recognition.

SUMMARY

According to an aspect of the present disclosure, a system is provided. The system may include at least one storage device storing executable instructions, and at least one processor in communication with the at least one storage device. When executing the executable instructions, the at least one processor may cause the system to perform one or more of the following operations. The operations may include obtaining, through a user interface implemented on a smart drawing board, one or more hand-drawn strokes inputted by a user and represented in a drawing region of the user interface; and in response to determining that an input termination condition is satisfied, determining a hand-drawn graphic corresponding to the one or more hand-drawn strokes. The determining the hand-drawn graphic corresponding to the one or more hand-drawn strokes may include determining, based on the one or more hand-drawn strokes, a first graphic and a first area of the first graphic; determining, based on the first graphic, a second graphic and a second area of the second graphic; determining whether a ratio of the second area to the first area is less than a first ratio threshold; and in response to determining that the ratio is less than the first ratio threshold, determining that the hand-drawn graphic is an ellipse; or in response to determining that the ratio is greater than the first ratio threshold, determining that the hand-drawn graphic is a non-ellipse.

In some embodiments, to determine that the input termination condition is satisfied, the operations may include obtaining an input interval time after drawing a current hand-drawn stroke and determining that the input termination condition is satisfied when the input interval time exceeds an interval time threshold.

In some embodiments, the one or more hand-drawn strokes may include one hand-drawn stroke. To determine that the input termination condition is satisfied, the operations may include determining a minimum distance between a starting point and a termination point of the hand-drawn stroke; and determining that the input termination condition is satisfied when the minimum distance is less than a second distance threshold.

In some embodiment, the one or more hand-drawn strokes may include at least two hand-drawn strokes, to determine that the input termination condition is satisfied, the operations may include determining a maximum distance among distances between every two adjacent end points of end points of the at least two hand-drawn strokes; and determining that the input termination condition is satisfied when the maximum distance is less than a second distance threshold.

In some embodiments, to determine the second distance threshold, the operations may include obtaining an area of a convex hull corresponding to track points of hand-drawn strokes that have been drawn; and determining, based on the area of the convex hull, the second distance threshold.

In some embodiments, the first graphic may include a convex hull, and the second graphic may include a maximum inscribed quadrilateral of the convex hull.

In some embodiments, when the hand-drawn graphic is the ellipse, a count of the one or more hand-drawn strokes may be one or two.

In some embodiments, each hand-drawn stroke may include a plurality of track points. In response to determining that the hand-drawn graphic is the ellipse, the operations may include constructing a first function based on a sum of squares of distances from track points of the ellipse to an ellipse corresponding to an ellipse equation; determining a first partial derivative result by determining a partial derivative of the first function with respect to each of one or more ellipse parameters of the ellipse; and determining the one or more ellipse parameters of the ellipse by solving the first partial derivative results.

In some embodiments, in response to determining that the hand-drawn graphic is the non-ellipse, the operations may include determining whether the one or more hand-drawn strokes include a polyline stroke; and in response to determining that the one or more hand-drawn strokes include the polyline stroke, segmenting the polyline stroke into multiple stroke segments, each of the multiple stroke segments corresponding to a modified straight line.

In some embodiments, the segmenting the polyline stroke into multiple stroke segments may include extracting one or more inflection points of the polyline stroke; and segmenting, based on the one or more inflection points, the polyline stroke.

In some embodiments, the extracting one or more inflection points of the polyline stroke may include for each track point of the polyline stroke, calculating a curvature corresponding to the track point of the polyline stroke; and designating the track point as the inflection point when the curvature is greater than a curvature threshold.

In some embodiments, before segmenting, based on the one or more inflection points, the polyline stroke, the operations may include deleting a first count of inflection points close to a starting point of the polyline stroke; deleting a second count of inflection points close to a termination point of the polyline stroke; or deleting a current inflection point when a count of track points between the current inflection point and a next inflection point is less than a threshold.

In some embodiments, before determining whether the hand-drawn graphic is an ellipse, the operations may include for each of the one or more hand-drawn strokes, determining a reference straight line by connecting a starting point and a termination point of the hand-drawn stroke; determining whether the reference straight line satisfies a condition; in response to determining that the reference straight line satisfies the condition, determining that the hand-drawn stroke is a straight line; or in response to determining that the reference straight line does not satisfy the condition, determining that the hand-drawn stroke is a non-straight line. The condition may include that a distance from at least one track point other than the starting point and the termination point of the hand-drawn stroke to the reference straight line is less than a first distance threshold, and a ratio of a length of the reference straight line to a sum of distances between every two adjacent track points of the hand-drawn stroke is greater than a second ratio threshold.

In some embodiments, each hand-drawn stroke may include a plurality of track points, and in response to determining that the hand-drawn stroke is a straight line, the operations may include constructing a second function based on a sum of squares of distances from track points of the straight line to a straight line corresponding to a straight line equation; determining a second partial derivative result by determining a partial derivative of the second function with respect to each of one or more line parameters of the straight line; and determining the one or more line parameters of the straight line by solving the second partial derivative results.

In some embodiments, in response to determining that each of the one or more hand-drawn strokes is the straight line, the operations may include determining an intersection point of every two adjacent straight lines; and determining the hand-drawn graphic by connecting the intersection points of the one or more straight lines in sequence.

In some embodiments, the operations may further include modifying the hand-drawn graphic based on modification features of a shape type of the hand-drawn graphic.

According to another aspect of the present disclosure, a method is provided. The method may be implemented on at least one computing device, each of which may include at least one processor and a storage device. The method may include obtaining, through a user interface implemented on a smart drawing board, one or more hand-drawn strokes inputted by a user and represented in a drawing region of the user interface; and in response to determining that an input termination condition is satisfied, determining a hand-drawn graphic corresponding to the one or more hand-drawn strokes. The determining the hand-drawn graphic corresponding to the one or more hand-drawn strokes may include determining, based on the one or more hand-drawn strokes, a first graphic and a first area of the first graphic; determining, based on the first graphic, a second graphic and a second area of the second graphic; determining whether a ratio of the second area to the first area is less than a first ratio threshold; and in response to determining that the ratio is less than the first ratio threshold, determining that the hand-drawn graphic is an ellipse; or in response to determining that the ratio is greater than the first ratio threshold, determining that the hand-drawn graphic is a non-ellipse.

According to yet another aspect of the present disclosure, a system is provided. The system implemented on a computing device may have a processor, a storage medium, and a communication platform connected to a network. The system may include an obtaining module and a determination module. The obtaining module may be configured to obtain, through a user interface implemented on a smart drawing board, one or more hand-drawn strokes inputted by a user and represented in a drawing region of the user interface. The determination module may be configured to in response to a determination that an input termination condition is satisfied, determine a hand-drawn graphic corresponding to the one or more hand-drawn strokes. The determination module may be further configured to: determine, based on the one or more hand-drawn strokes, a first graphic and a first area of the first graphic; determine, based on the first graphic, a second graphic and a second area of the second graphic; determine whether a ratio of the second area to the first area is less than a first ratio threshold; and in response to a determination that the ratio is less than the first ratio threshold, determine that the hand-drawn graphic is an ellipse; or in response to a determination that the ratio is greater than the first ratio threshold, determine that the hand-drawn graphic is a non-ellipse.

According to yet another aspect of the present disclosure, a non-transitory computer-readable medium storing at least one set of instructions is provided. When executed by at least one processor, the at least one set of instructions may direct the at least one processor to perform a method. The method may include obtaining, through a user interface implemented on a smart drawing board, one or more hand-drawn strokes inputted by a user and represented in a drawing region of the user interface; and in response to determining that an input termination condition is satisfied, determining a hand-drawn graphic corresponding to the one or more hand-drawn strokes. The determining the hand-drawn graphic corresponding to the one or more hand-drawn strokes may include determining, based on the one or more hand-drawn strokes, a first graphic and a first area of the first graphic; determining, based on the first graphic, a second graphic and a second area of the second graphic; determining whether a ratio of the second area to the first area is less than a first ratio threshold; and in response to determining that the ratio is less than the first ratio threshold, determining that the hand-drawn graphic is an ellipse; or in response to determining that the ratio is greater than the first ratio threshold, determining that the hand-drawn graphic is a non-ellipse.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 3 is a flowchart illustrating an exemplary process for determining a hand-drawn graphic according to some embodiments of the present disclosure;

DETAILED DESCRIPTION

Figure 1:
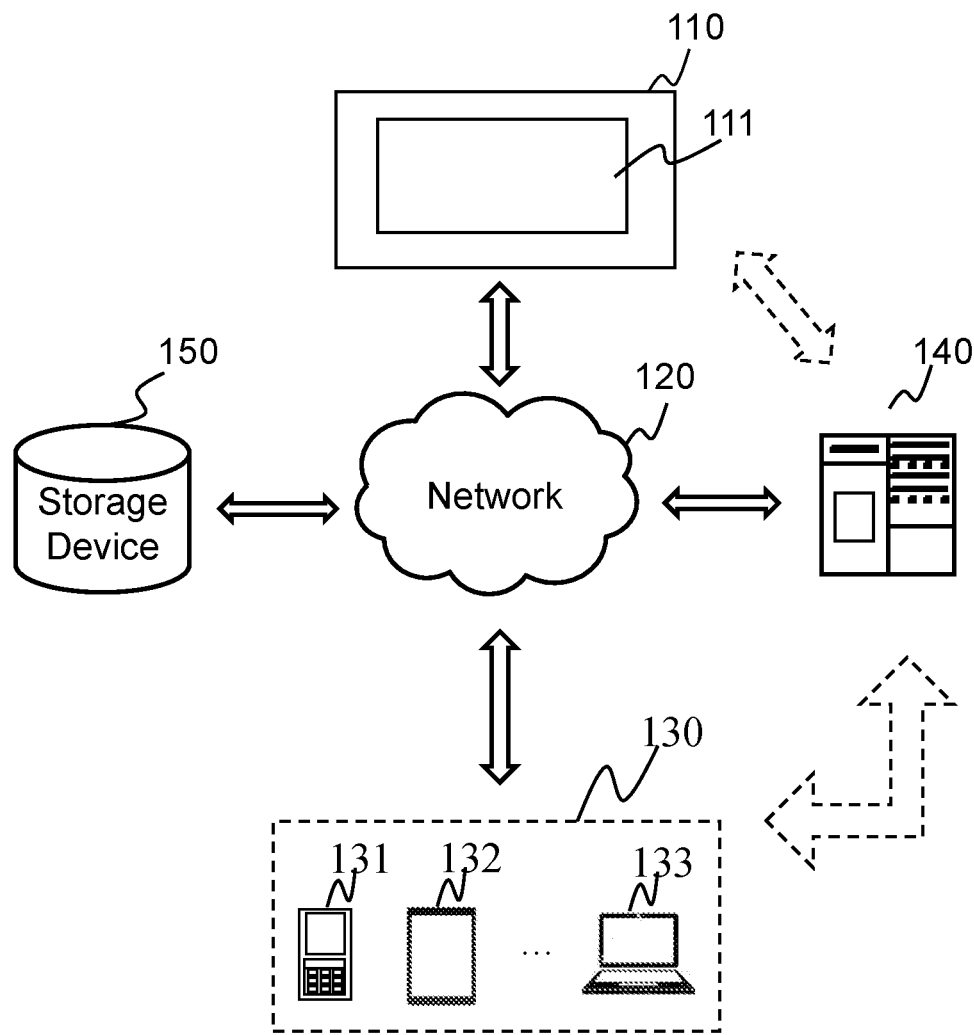
FIG. 1 is a schematic diagram illustrating an exemplary hand-drawn graphic determination system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an erasable programmable read-only memory (EPROM). It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/ blocks that may be combined with other modules/units/ blocks or divided into sub-modules/sub-units/sub-blocks despite their physical organization or storage. The description may be applicable to a system, an engine, or a portion thereof.

It will be understood that the term "system," "engine," "unit," "module," and/or "block" used herein are one method to distinguish different components, elements, parts, sections or assembly of different levels in ascending order. However, the terms may be displaced by another expression if they achieve the same purpose.

It will be understood that, although the terms "first," "second," "third," etc., may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present disclosure.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in an inverted order, or simultaneously. Moreover, one or more other operations may be added to the flowcharts. One or more operations may be removed from the flowcharts.

Provided herein are systems and methods for determining a hand-drawn graphic. The systems and methods may obtain, through a user interface implemented on a smart drawing board, one or more hand-drawn strokes inputted by a user and represented in a drawing region of the user interface. In response to a determination that an input termination condition is satisfied, the systems and methods may further determine a hand-drawn graphic corresponding to the one or more hand-drawn strokes. In some embodiments, the systems and methods provided in the present disclosure may determine whether the hand-drawn graphic is an ellipse. Specifically, the systems and methods may determine a first graphic (e.g., a convex hull) and a first area of the first graphic based on the one or more hand-drawn strokes. The systems and methods may further determine a second graphic (e.g., an inscribed polygon) and a second area of the second graphic based on the first graphic. The systems and methods may determine whether the hand-drawn graphic is an ellipse based on a ratio of the second area to the first area.

According to some embodiments of the present disclosure, the systems and methods may determine whether the hand-drawn graphic corresponding to the hand-drawn stroke(s) is an ellipse based on the area of the convex hull corresponding to the hand-drawn stroke(s) and the area of the inscribed polygon (e.g., maximum inscribed quadrilateral) of the convex hull, which effectively distinguishes an ellipse from a non-ellipse (e.g., a polygon), and improves the accuracy of ellipse recognition. Further, in response to a determination that the hand-drawn graphic is a non-ellipse, the systems and methods may segment polyline strokes of the hand-drawn stroke(s) into stroke segments. The systems and methods may perform a fitting operation on each stroke segment and then determine a modified hand-drawn graphic based on the processed stroke segments, thereby effectively improving the accuracy and robustness of determining/generating hand-drawn graphics.

FIG. 1 is a schematic diagram illustrating an exemplary hand-drawn graphic determination system according to some embodiments of the present disclosure. As shown in FIG. 1, the hand-drawn graphic determination system 100 may include a smart drawing board 110, a network 120, a terminal device 130, a processing device 140, and a storage device 150. Components of the hand-drawn graphic determination system 100 may be connected with each other via the network 120. For example, the processing device 140 and the smart drawing board 110 may be connected or communicated via the neural 120.

The smart drawing board 110 may have a drawing region 111 for a user to draw hand-drawn graphics. The smart drawing board 110 may include a user interface. The user interface may be configured to facilitate a communication between the user, the smart drawing board 110, and the processing device 140. For example, a user may input hand-drawn strokes in the drawing region of the smart drawing board 110 through the user interface implemented on the smart drawing board 110. As another example, the processing device 140 may obtain an input of the user and convert the input of the user into the hand-drawn strokes and present the hand-drawn strokes in the drawing region of the smart drawing board 110. As still another example, the processing device 140 may modify the hand-drawn strokes and present the modified hand-drawn strokes in the drawing region of the smart drawing board 110.

In some embodiments, the smart drawing board 110 may include a touch screen. The user may touch the touch screen to input information (e.g., hand-drawn strokes). The processing device 140 may receive the inputted information through the user interface and process the inputted information. In some embodiments, a shape of the drawing region may be a rectangle, a circle, etc. In some embodiments, the smart drawing board 110 may be implemented on a smart device with a touch screen such as a smart whiteboard, a mobile phone, a tablet, etc. In some embodiments, the smart drawing board 110 may be part of the terminal device 130.

The network 120 may facilitate the exchange of information and/or data for the hand-drawn graphic determination system 100. In some embodiments, one or more components (e.g., the smart drawing board 110, the terminal device 130, the processing device 140, or the storage device 150) of the hand-drawn graphic determination system 100 may transmit information and/or data to one or more other components of the hand-drawn graphic determination system 100 via the network 120. For example, the processing device 140 may obtain/acquire parameters (e.g., a first ratio threshold, a second ratio threshold) input by a user from the smart drawing board 110 via the network 120.

The terminal device 130 may be configured to receive information and/or data from the smart drawing board 110, the processing device 140, and/or the storage device 150 via the network 120. For example, the terminal device 130 may receive the hand-drawn graphic determined by the processing device 140. As another example, the terminal device 130 may enable user interactions with the hand-drawn graphic determination system 100. In some embodiments, the terminal device 130 may include a mobile device 131, a tablet computer 132, a laptop computer 133, or the like, or any combination thereof. In some embodiments, the terminal device 130 may be part of the processing device 140.

The processing device 140 may process data and/or information obtained from the smart drawing board 110, the storage device 150, the terminal device 130, or other components of the hand-drawn graphic determination system 100. For example, the processing device 140 may determine whether a hand-drawn graphic corresponding to multiple hand-drawn strokes is an ellipse. As another example, the processing device 140 may further modify the hand-drawn graphic. In some embodiments, the processing device 140 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing device 140 may be part of the smart drawing board 110.

The storage device 150 may be configured to store data and/or instructions. In some embodiments, the storage device 150 may store data and/or instructions that the processing device 140 may execute or use to perform exemplary methods described in the present disclosure. In some embodiments, the storage device 150 may include a mass storage device, a removable storage device, a volatile read-and-write memory, a read-only memory (ROM), or the like, or any combination thereof. In some embodiments, the storage device 150 may be implemented on a cloud platform as described elsewhere in the present disclosure. In some embodiments, the storage device 150 may be part of another component of the hand-drawn graphic determination system 100, such as the processing device 140, the smart drawing board 110, or the terminal device 130.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the hand-drawn graphic determination system 100 may include one or more additional components and/or one or more components of the hand-drawn graphic determination system 100 described above may be omitted. Additionally or alternatively, two or more components of the hand-drawn graphic determination system 100 may be integrated into a single component. A component of the hand-drawn graphic determination system 100 may be implemented on two or more sub-components.

Figure 2:
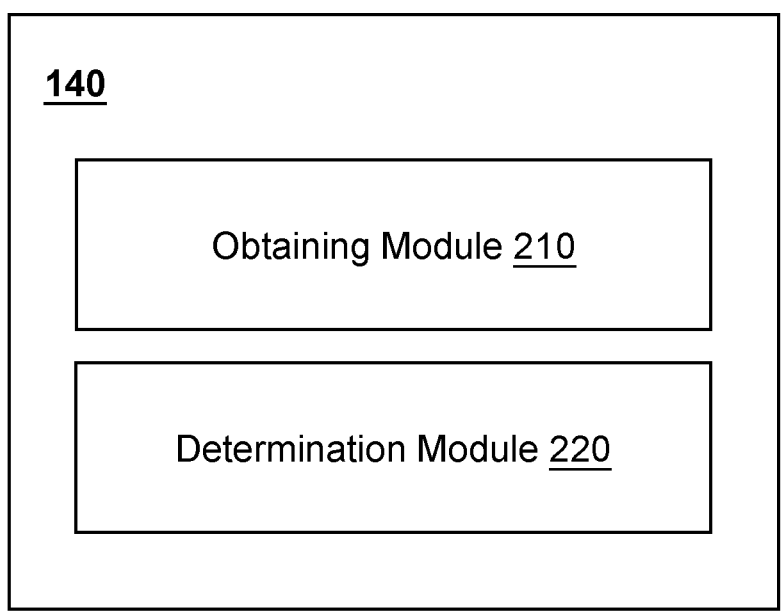
FIG. 2 is a block diagram illustrating an exemplary processing device according to some embodiments of the present disclosure.

FIG. 2 is a block diagram illustrating an exemplary processing device according to some embodiments of the present disclosure. As illustrated in FIG. 2, the processing device 140 may include an obtaining module 210 and a determination module 220.

The obtaining module 210 may be configured to obtain, through a user interface implemented on a smart drawing board, one or more hand-drawn strokes inputted by a user and represented in a drawing region of the user interface.

The information or data of each hand-drawn stroke may include a plurality of track points sampled by a detector sequentially in time order from the drawing region during a drawing process of a user. In some embodiments, the obtaining module 210 may further perform a first denoising operation (e.g., deduplication processing) on the track points of the one or more hand-drawn strokes.

The determination module 220 may be configured to determine a hand-drawn graphic corresponding to the one or more hand-drawn strokes. In some embodiments, the determination module 220 may first determine whether an input termination condition is satisfied. For example, the determination module 220 may determine whether the input termination condition is satisfied based on time. As another example, the determination module 220 may determine whether the input termination condition is satisfied based on whether the hand-drawn stroke(s) that have been drawn (or an intermediate hand-drawn graphic corresponding to the hand-drawn stroke(s)) form a closed structure.

In some embodiments, in response to the determination that the input termination condition is satisfied, the determination module 220 may determine a shape type of a hand-drawn graphic corresponding to the one or more hand-drawn strokes, and determine the hand-drawn graphic based on the shape type of the hand-drawn graphic. In some embodiments, in response to the determination that the input termination condition is satisfied, the determination module 220 may determine whether the hand-drawn graphic corresponding to the hand-drawn stroke(s) is a straight line. In response to a determination that the hand-drawn graphic is the straight line, the determination module 220 may perform a fitting operation on the hand-drawn graphic. In response to a determination that the hand-drawn graphic is a non-straight line, the determination module 220 may further determine whether the hand-drawn graphic is an ellipse. In response to the determination that the hand-drawn graphic is the ellipse, the determination module 220 may perform a fitting operation on the hand-drawn graphic to modify the hand-drawn graphic. In some embodiments, in response to the determination that the hand-drawn graphic is the non-ellipse, the determination module 220 may determine whether the hand-drawn stroke(s) include a polyline stroke. In response to a determination that the hand-drawn stroke(s) include the polyline stroke, the determination module 220 may segment the polyline stroke into multiple stroke segments. Each of the multiple stroke segments may correspond to a modified straight line having a certain length. In some embodiments, the determination module 220 may perform the fitting operation on each stroke segment to determine the modified straight line. In some embodiments, after determining the modified straight line corresponding to each stroke segment of the hand-drawn stroke(s), the determination module 220 may determine the hand-drawn graphic corresponding to the hand-drawn stroke(s) based on the modified straight lines.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, the processing device 140 may include one or more additional modules. For example, the processing device 140 may further include a transmission module configured to transmit signals to one or more components (e.g., the terminal device 130) of the hand-drawn graphic determination system 100. As a further example, the processing device 140 may include a storage module (not shown) used to store information and/or data (e.g., the track points of the hand-drawn stroke(s), position information of the hand-drawn stroke(s)) associated with the hand-drawn graphic determination system 100.

FIG. 3 is a flowchart illustrating an exemplary process for determining a hand-drawn graphic according to some embodiments of the present disclosure. In some embodiments, a process 300 may be implemented as a set of instructions (e.g., an application) stored in the storage device 150. The processing device 140 may execute the set of instructions, and when executing the instructions, the processing device 140 may be configured to perform the process 300. The operations of the illustrated process presented below are intended to be illustrative. In some embodiments, the process 300 may be accomplished with one or more additional operations not described and/or without one or more of the operations discussed. Additionally, the order in which the operations of the process 300 illustrated in FIG. 3 and described below is not intended to be limiting.

In 310, the processing device 140 (e.g., the obtaining module 210) may obtain, through a user interface implemented on a smart drawing board, one or more hand-drawn strokes inputted by a user and represented in a drawing region of the user interface. The one or more hand-drawn strokes may correspond a hand-drawn graphic. As used herein, the drawing region may refer to a region on the smart drawing board for a user to draw. In some embodiments, the smart drawing board may be implemented on a smart device (e.g., a smart whiteboard, a touch screen mobile phone, etc.). In some embodiments, a shape of the drawing region may be a rectangle, a circle, etc. A hand-drawn stroke refers to a graphic drawn by the user on the drawing region at one time. That is, during a drawing process, when the user's drawing tool (e.g., fingers, a stylus, etc.) leaves the drawing region, it may indicate that one hand-drawn stroke has been drawn. In some embodiments, the hand-drawn stroke may be any graphic such as a line (including a straight line, an arc, etc.), a circle, an ellipse, a triangle, a rectangle, a five-pointed star, etc.

Obtaining a hand-drawn stroke refers to obtaining information of the hand-drawn stroke, such as an image including the hand-drawn stroke, data (e.g., shape, location associated with a trajectory) of the hand-drawn stroke, etc. In some embodiments, the information or data of each hand-drawn stroke may include a plurality of track points sampled by a detector sequentially in time order from the drawing region during a drawing process of a user. The processing device 140 may determine a location or shape of the hand-drawn stroke based on positions of the plurality of track points in the drawing region. Each hand-drawn stroke may include a starting point and a termination point. The starting point and the termination point of the hand-drawn stroke may be the first track point and the last track point of the plurality of track points of the hand-drawn stroke, respectively. In some embodiments, the starting point and the termination point of the hand-drawn stroke may also be referred to as end points of the hand-drawn stroke.

In some embodiments, in order to improve the accuracy of recognition, the processing device 140 may perform a first denoising operation (e.g., deduplication processing) on the track points of the one or more hand-drawn strokes. For example, the processing device 140 may determine a distance between every two adjacent track points. The processing device 140 may determine the two adjacent track points whose distance is less than a certain distance as two repeated track points. The processing device 140 may delete any one of the two repeated track points.

In 320, in response to determining that an input termination condition is satisfied, the processing device 140 (e.g., the determination module 220) may determine a hand-drawn graphic corresponding to the one or more hand-drawn strokes.

The processing device 140 may determine whether the input termination condition is satisfied. That is, the processing device 140 may determine whether the user has finished input (i.e., drawing the hand-drawn graphic). In response to a determination that the user has finished drawing, the processing device 140 may generate the hand-drawn graphic and update the hand-drawn graphic on the drawing region.

In some embodiments, the processing device 140 may determine whether the input termination condition is satisfied based on time. Specifically, the processing device 140 may determine an input interval time from the last hand-drawn stroke inputted by the user to the current time. If the input interval time exceeds an interval time threshold (e.g., 1 s, 0.8 s. 0.5 s, 0.3 s, etc.), the processing device 140 may determine that the input termination condition is satisfied, that is, the user has finished drawing. Then the processing device 140 may process the hand-drawn stroke(s) that have been drawn to generate the hand-drawn graphic. In some embodiments, the interval time threshold may be set according to a default setting of the hand-drawn graphic determination system 100 or preset by a user or operator via the terminal device 130.

In some embodiments, the processing device 140 may determine whether the input termination condition is satisfied based on whether the hand-drawn stroke(s) that have been drawn (or an intermediate hand-drawn graphic corresponding to the hand-drawn stroke(s)) form a closed structure. As used herein, a closed structure refers to a structure in which end points of the last hand-drawn stroke are connected to end points of other hand-drawn strokes, respectively. In some embodiments, when the hand-drawn stroke(s) includes only one hand-drawn stroke, the processing device 140 may determine a minimum distance between a starting point and a termination point of the hand-drawn stroke. If the minimum distance between the starting point and the termination point of the hand-drawn stroke is less than a second distance threshold, the processing device 140 may determine that the starting point and the termination point of the hand-drawn stroke are closed. In such cases, the processing device 140 may determine that the input termination condition is satisfied. In other words, the hand-drawn stroke itself may form the hand-drawn graphic. For example, in some application scenarios, the user may draw a sealed hand-drawn graphic such as a circle, an ellipse, a triangle, a quadrilateral etc., with only one hand-drawn stroke.

In some embodiments, when the hand-drawn stroke(s) include at least two hand-drawn strokes, the processing device 140 may determine a maximum distance among distances between every two adjacent end points of the at least two hand-drawn strokes. As used herein, two adjacent end points of the at least two hand-drawn strokes may refer to two end points of two hand-drawn strokes that are close to each other compared to other hand-drawn strokes. For example, for two hand-drawn strokes including a first hand-drawn stroke and a second hand-drawn stroke, if a termination point of the first hand-drawn stroke is connected to a starting point of the second hand-drawn stroke, the termination point of the first hand-drawn stroke and the starting point of the second hand-drawn stroke may be the two adjacent end points of the two hand-drawn strokes. If the maximum distance is less than the second distance threshold, the processing device 140 may determine that the input termination condition is satisfied. In other words, the at least two hand-drawn strokes may form the hand-drawn graphic. For example, the user may draw a desired hand-drawn graphic by inputting multiple hand-drawn strokes. Merely by way of example, the user may input three sides of a triangle in sequence. Each side may be one hand-drawn stroke. As another example, when drawing an ellipse, the user may input the ellipse in two times, that is, the ellipse may have two hand-drawn strokes.

In some embodiments, the second distance threshold may be set according to a default setting of the hand-drawn graphic determination system 100 or preset by a user or operator via the terminal device 130. In some embodiments, since the second distance threshold may affect the accuracy of recognizing/generating the hand-drawn graphic, the second distance threshold may need to be controlled within a certain range. For example, during a drawing process of a hand-drawn stroke, the starting point and the termination point of the hand-drawn stroke may be drawn close due to hand shaking, instead of ending the drawing. In such cases, if the second distance threshold is too large, the processing device 140 may determine that the user has finished drawing, resulting in that the generated hand-drawn graphic may not be a hand-drawn graphic expected by the user, thereby reducing the accuracy of the hand-drawn graphic and the user experience. As another example, when the user wants to end the drawing, the starting point and the termination point may need to be extended close to each other to allow the processing device 140 to recognize the connection between the starting point and the termination point. In such cases, if the second distance threshold is too small, it may increase the difficulty of drawing for the user, thereby decreasing the accuracy of the hand-drawn graphic and also reducing the user experience.

In some embodiments, the second distance threshold may be determined based on an area of the intermediate hand-drawn graphic corresponding to the hand-drawn stroke(s) that have been inputted. The greater the area of the intermediate hand-drawn graphic is, the greater the second distance threshold may be. In some embodiments, the second distance threshold may be determined based on an area of a convex hull (e.g., the convex hull 610 illustrated in FIG. 6) corresponding to track points of the intermediate hand-drawn graphic (or the hand-drawn stroke(s)). The greater the area of the convex hull is, the greater the second distance threshold may be. For example, the processing device 140 may determine the convex hull based on track points of the hand-drawn stroke(s) that have been drawn. The processing device 140 may determine the second distance threshold by adjusting a default second distance threshold corresponding to a default area based on the area of the convex hull. In some embodiments, the processing device 140 may determine an area of a rectangle based on coordinates of the rightmost track point, the leftmost track point, the uppermost track point, and the lowermost track point of the hand-drawn stroke(s). The processing device 140 may determine the second distance threshold based on the area of the rectangle.

In some embodiments, in response to the determination that the input termination condition is satisfied, the processing device 140 may determine a shape type of a hand-drawn graphic corresponding to the one or more hand-drawn strokes, and determine the hand-drawn graphic based on the shape type of the hand-drawn graphic.

In some embodiments, in response to the determination that the input termination condition is satisfied, the processing device 140 may determine whether the hand-drawn graphic corresponding to the hand-drawn stroke(s) is a straight line. In response to a determination that the hand-drawn graphic is the straight line, the processing device 140 may perform a fitting operation on the hand-drawn graphic. More descriptions for determining the hand-drawn graphic that is a straight line by performing the fitting operation on a hand-drawn stroke may be found elsewhere of the present disclosure (e.g., FIG. 5 and the descriptions thereof).

In response to a determination that the hand-drawn graphic is a non-straight line, the processing device 140 may further determine whether the hand-drawn graphic is an ellipse. Specifically, the processing device 140 may determine a first graphic and a first area of the first graphic based on the hand-drawn stroke(s). The processing device 140 may determine a second graphic and a second area of the second graphic based on the first graphic. The processing device 140 may determine whether a ratio of the second area to the first area is less than a first ratio threshold. The processing device 140 may determine that the hand-drawn graphic is the ellipse when the ratio is less than the first ratio threshold. In response to the determination that the hand-drawn graphic is the ellipse, the processing device 140 may perform a fitting operation on the hand-drawn graphic to modify the hand-drawn graphic. More descriptions for determining whether the hand-drawn graphic corresponding to the hand-drawn stroke(s) is an ellipse and determining the hand-drawn graphic that is an ellipse may be found elsewhere of the present disclosure (e.g., FIG. 4 and the descriptions thereof).

It should be noted that the above descriptions are merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 4:
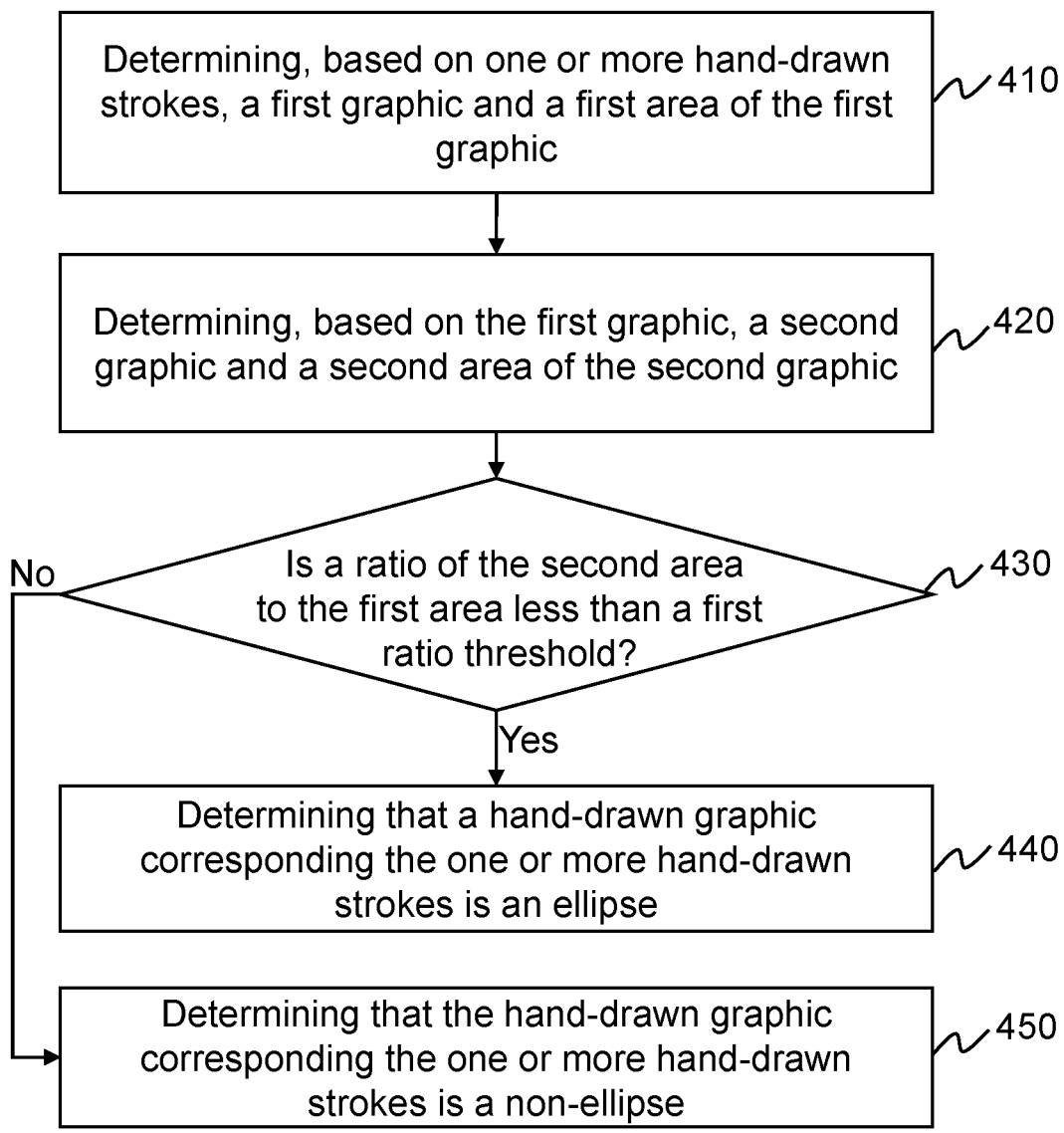
FIG. 4 is a flowchart illustrating an exemplary process for determining a hand-drawn graphic according to some embodiments of the present disclosure.

FIG. 4 is a flowchart illustrating an exemplary process for determining a hand-drawn graphic according to some embodiments of the present disclosure. In some embodiments, a process 400 may be implemented as a set of instructions (e.g., an application) stored in the storage device 150. The processing device 140 may execute the set of instructions, and when executing the instructions, the processing device 140 may be configured to perform the process 400. The operations of the illustrated process presented below are intended to be illustrative. In some embodiments, the process 400 may be accomplished with one or more additional operations not described and/or without one or more of the operations discussed. Additionally, the order in which the operations of the process 400 illustrated in FIG. 4 and described below is not intended to be limiting.

In 410, the processing device 140 (e.g., the determination module 220) may determine a first graphic and a first area of the first graphic based on one or more hand-drawn strokes that have been drawn.

Figure 6:
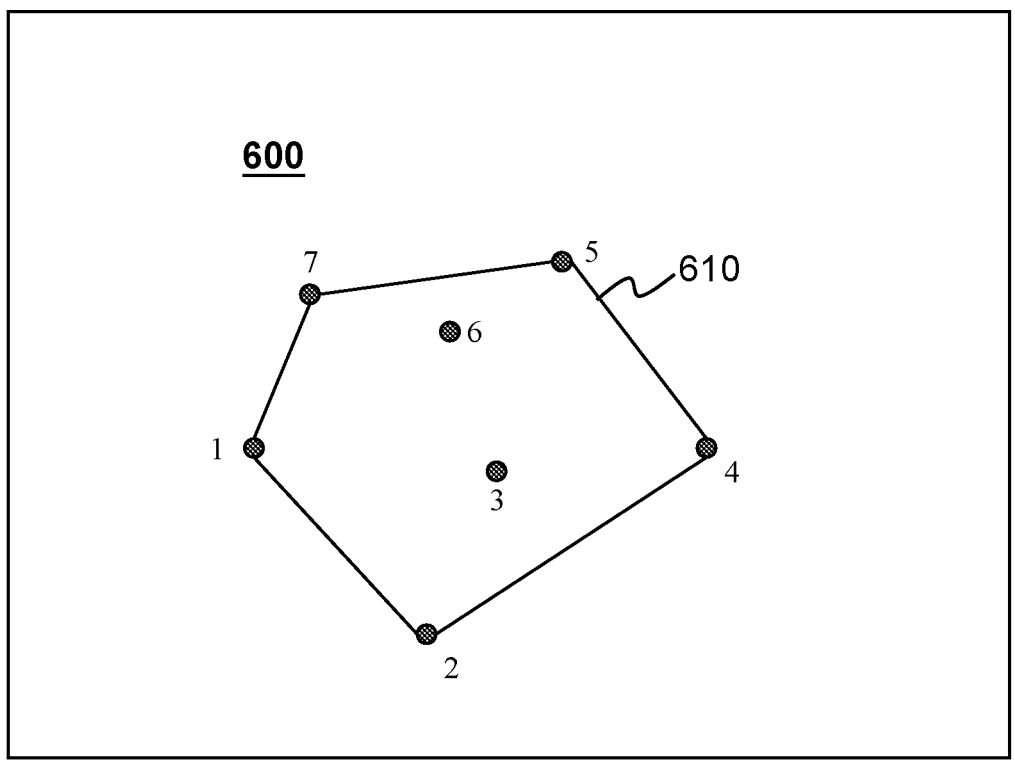
FIG. 6 is a schematic diagram illustrating a convex hull according to some embodiments of the present disclosure.

In some embodiments, the first graphic may be a convex hull formed by the hand-drawn stroke(s). As used herein, the convex hull may refer to a convex polygon formed by connecting the outermost track points among track points of the one or more hand-drawn strokes. For example, as illustrated in FIG. 6, the convex polygon 610 may be the convex hull of hand-drawn stroke(s) corresponding to the hand-drawn graphic 600.

In 420, the processing device 140 (e.g., the determination module 220) may determine a second graphic and a second area of the second graphic based on the first graphic.

In some embodiments, the second graphic may be an inscribed polygon of the first graphic (i.e., the convex hull). For example, the second graphic may be a maximum inscribed quadrilateral of the convex hull. In some embodiments, the processing device 140 may determine the second area of the maximum inscribed quadrilateral using a rotating calipers algorithm.

In 430, the processing device 140 (e.g., the determination module 220) may determine whether a ratio of the second area to the first area is less than a first ratio threshold. In some embodiments, the first ratio threshold may be determined based on characteristics of an ellipse to distinguish an ellipse and other graphics (e.g., a triangle, a quadrilateral, a pentagon, etc.). In some embodiments, the first ratio threshold may be 0.85, 0.8, 0.75, etc.

In response to a determination that the ratio of the second area to the first area is less than the first ratio threshold, the processing device 140 may determine that a hand-drawn graphic corresponding to the hand-drawn stroke(s) is an ellipse in operation 440. Conversely, in response to a determination that the ratio of the second area to the first area is greater than the first ratio threshold, the processing device 140 may determine that the hand-drawn graphic is a non-ellipse in operation 450.

In some embodiments, in response to the determination that the hand-drawn graphic is the ellipse, the processing device 140 may perform a fitting operation on the hand-drawn graphic to modify the hand-drawn graphic. In some embodiments, the fitting operation may be used to determine a standard equation corresponding to the hand-drawn graphic. For example, when the hand-drawn graphic is the ellipse, the fitting operation may be to determine a standard ellipse equation corresponding to the ellipse. As another example, when the hand-drawn graphic is a straight line, the fitting operation may be to determine a straight line standard equation corresponding to the straight line.

In some embodiments, the processing device 140 may construct a first function based on a sum of squares of distances from track points of the hand-drawn graphic to an ellipse corresponding to an ellipse equation. The processing device 140 may determine a first partial derivative result by determining a partial derivative of the first function with respect to each of one or more ellipse parameters. The processing device 140 may determine the one or more ellipse parameters by solving the first partial derivative results. The processing device 140 may modify the hand-drawn graphic corresponding to the hand-drawn strokes based on the one or more determined ellipse parameters. For example, the processing device 140 may update the hand-drawn graphic with the ellipse corresponding to the ellipse equation.

In some embodiments, the processing device 140 may perform the fitting operation using a least-squares technique to determine the ellipse parameters of the ellipse. For example, an ordinary ellipse equation may be constructed as Equation (1) as follows:

$$Q(x, y) = Ax^2 + Bxy + Cy^2 + Dx + Ey + F = 0, \quad (1)$$

where A, B, C, D, and E denote the ellipse parameters. In some embodiments, the processing device 140 may determine the first function (also referred to as a first objective function) based on algebraic distances. In order to prevent the ellipse parameters A, B, C, D, E, and F obtained by fitting from being all zero, F may be set to 1, and the first objective function (i.e., the first function) may be determined as Equation (2) as follows:

$$L = \sum_{i=0}^{n} Q(x_i, y_i)^2, \qquad (2)$$

where, $(x_i, y_i)$ denotes the i-th track point; $x_i$ denotes the abscissa of the i-th track point of the hand-drawn graphic; and $y_i$ denotes the ordinate of the i-th track point of the hand-drawn graphic.

The processing device 140 may obtain first partial derivative results by determining partial derivatives $$\frac{\partial L}{\partial A}, \frac{\partial L}{\partial B}, \frac{\partial L}{\partial C}, \frac{\partial L}{\partial D},$$

and $\frac{\partial L}{\partial E}$ of the first function L with respect to the track points A, B, C, D, and E, respectively. Five first partial derivative results (also referred to as first partial derivative equations) may be determined by assuming $$\frac{\partial L}{\partial A} = 0, \frac{\partial L}{\partial B} = 0, \frac{\partial L}{\partial C} = 0, \frac{\partial L}{\partial D} = 0,$$

and $\frac{\partial L}{\partial E} = 0.$

Then the processing device 140 may determine the ellipse parameters A, B, C, D, and E by solving the five first partial derivative results, thereby determining the ordinary ellipse equation of the ellipse. In some embodiments, the processing device 140 may transform the ordinary ellipse equation of the ellipse into a standard ellipse equation. As a result, feature parameters of the ellipse including a coordinate of an ellipse center, a major axis, a minor axis, an ellipse inclination angle, etc., may be directly determined then. The processing device 140 may display a standard ellipse (i.e., the modified hand-drawn graphic) corresponding to the standard ellipse equation on a drawing region of a smart device.

In some embodiments, if a ratio of the major axis to the minor axis of the ellipse is in a certain ratio range (e.g., 0.8-1.2, 0.87-1.13, etc.), the processing device 140 may further modify the ellipse to a circle. Then the processing device 140 may display the circle on the drawing region of the smart device.

In some embodiments, in response to the determination that the hand-drawn graphic is the non-ellipse, the processing device 140 may determine whether the hand-drawn stroke(s) include a polyline stroke. As used herein, a polyline stroke may refer to a non-linear stoke formed by successively connecting multiple line segments. For example, for a quadrilateral composed of two hand-drawn strokes, one of the two hand-drawn strokes may be a straight line and the other may be a polyline stroke having a U shape. As another example, for a rectangle composed of two hand-drawn strokes, the two hand-drawn strokes may be the same polyline stroke having an L shape. In response to a determination that the hand-drawn stroke(s) include the polyline stroke, the processing device 140 may segment the polyline stroke into multiple stroke segments. Each of the multiple stroke segments may correspond to a modified straight line having a certain length. In some embodiments, the modified straight line having a certain length may also be referred to as a line segment. In some embodiments, the processing device 140 may perform the fitting operation on each stroke segment to determine the modified straight line. More descriptions for determining a modified straight line by performing the fitting operation on a stroke segment may be found elsewhere of the present disclosure (e.g., FIG. 5 and the descriptions thereof).

In some embodiments, the polyline stroke may be segmented based on one or more inflection points of the polyline stroke. As used herein, an inflection point may refer to a track point corresponding to a position where the polyline stroke is bent. For example, if the polyline stroke includes track points 1~10, and the polyline stroke is bent at track point 5, then track point 5 may be determined as an inflection point of the polyline stroke. As another example, for a polyline stroke having a V shape, the vertex of the V shape may be the inflection point of the polyline stroke. As a further example, for a polyline stroke having an M shape, the two vertexes of the M shape may be the inflection points of the polyline stroke.

In some embodiments, the processing device 140 may extract the inflection points of the polyline stroke based on curvatures corresponding to track points of the polyline stroke. Specifically, the processing device 140 may calculate a curvature corresponding to each track point of the polyline stroke. A curvature of each track point may reflect a degree to which a tangent corresponding to the track point deviates from tangents corresponding to other track points. The greater the curvature is, the greater the degree of deviation may be. The processing device 140 may designate the track point whose curvature is greater than a curvature threshold as the inflection point. In some embodiments, the curvature threshold may be set according to a default setting of the hand-drawn graphic determination system 100 or preset by a user or operator via the terminal device 130.

In some embodiments, the processing device 140 may determine a curvature of the current track point based on coordinates of the current track point and the previous track point. Merely by way of example, the coordinates of the current track point may be expressed as $(x_i, y_i)$, and the coordinates of the previous track point may be expressed as $(x_{i-1}, y_{i-1})$. The curvature K of the current track point may be determined according to Equation (3) as follows:

$$K = \frac{\Delta \varphi}{\Delta s}, \qquad (3)$$

where $\Delta \varphi$ denotes an angle between tangents of an arc segment between the current track point $(x_i, y_i)$ and the previous track point $(x_{i-1}, y_{i-1})$, $\Delta s$ denotes an arc length between the current track point and the previous track point. $\Delta \varphi$ and $\Delta s$ may be determined according to Equation (4) and Equation (5) as follows:

$$\Delta \varphi = \arctan\left(\frac{y_i - y_{i-1}}{x_i - x_{i-1}}\right), \qquad (4)$$

$$\Delta s = \sqrt{(x_i - x_{i-1})^2 + (y_i - y_{i-1})^2}, \qquad (5)$$

In some application scenarios, due to reasons, for example hand shaking, uncertainty about what to draw, etc., a hand-drawn stroke may have one or more noise points (e.g., inflection points). Thus, before segmenting the polyline stroke based on the inflection point(s), the processing device 140 may perform a second denoising operation on the extracted inflection points to delete the noise points. In some embodiments, the processing device 140 may determine a first count of inflection points close to a starting point of the polyline stroke as noise points, and/or a second count of inflection points close to a termination point of the polyline stroke as noise points. The processing device 140 may delete the first count of inflection points close to the starting point of the polyline stroke, and/or delete the second count of inflection points close to the termination point of the polyline stroke.

In some embodiments, two adjacent inflection points of the polyline stroke may be relatively close. The processing device 140 may delete inflection points according to a count of the track points between two adjacent inflection points. For example, if a count of track points between the current inflection point and the next inflection point is less than a threshold (e.g., 2, 3, etc.), the processing device 140 may delete the current inflection point.

In some embodiments, after segmenting the polyline stroke, the processing device 140 may determine a length of each modified straight line. The processing device 140 may further delete the modified straight line whose length is less than a length threshold to improve the accuracy of hand-drawn graphics recognition/generation.

In some embodiments, after determining the modified straight line corresponding to each stroke segment of the hand-drawn stroke(s), the processing device 140 may determine the hand-drawn graphic corresponding to the hand-drawn stroke(s) based on the modified straight lines. In some embodiments, the processing device 140 may determine an intersection point of every two adjacent modified straight lines. The processing device 140 may determine the hand-drawn graphic by connecting the intersection points of the modified straight lines in sequence. For example, if the hand-drawn stroke(s) include three modified straight lines that intersect each other, the processing device 140 may determine three intersection points. Then the processing device 140 may determine a triangle by connecting the three intersection points. As another example, if the hand-drawn stroke(s) include four modified straight lines intersect sequentially, the processing device 140 may determine four intersection points. Then the processing device 140 may determine a rectangle by connecting the four intersection points.

Merely by way of example, for two adjacent modified straight lines, a first straight line function corresponding to the first modified straight line may be determined as Equation (6) and a second straight line function corresponding to the second modified straight line may be determined as Equation (7) as follows:

$$y_1 = a_1 x + b_1, \quad (6)$$

$$y_2 = a_2 x + b_2. \quad (7)$$

According to Equations (6) and (7), the abscissa x and ordinate y of an intersection point (x, y) of the first modified straight line and the second modified straight line may be determined according to Equations (8) and (9) as follows:

$$x = \frac{b_2 - b_1}{a_1 - a_2}, \quad (8)$$

-continued
$$y = a_1 \times x + b_1. \quad (9)$$

In some embodiments, when the hand-drawn graphic is the non-ellipse, the processing device 140 may further modify the hand-drawn graphic to improve the accuracy of hand-drawn graphics recognition/generation. Specifically, the processing device 140 may determine a shape type of the hand-drawn graphic. The processing device 140 may modify the hand-drawn graphic based on the shape type of the hand-drawn graphic. In some embodiments, the shape type may include a triangle type, a quadrilateral type, a pentagon type, etc. The processing device 140 may modify the hand-drawn graphic based on one or more modification features of the corresponding shape type. The modification feature(s) may include a ratio of lengths of two sides of the hand-drawn graphic, an angle between two sides of the hand-drawn graphic, or the like, or a combination thereof.

In some embodiments, for a specific hand-drawn graphic of the triangle type, the specific hand-drawn graphic may be an equilateral triangle, an isosceles triangle, a right-angled triangle, etc. When the hand-drawn graphic is determined to be a triangle (i.e., the shape type of the hand-drawn graphic is the triangle type), the processing device 140 may further modify the triangle based on one or more modification features associated with the triangle type. The modification feature(s) associated with the triangle type may include a ratio of lengths of any two sides of the triangle, an angle between any two sides of the triangle, etc. For example, if a ratio of any two sides of the triangle is within a certain range (e.g., 0.9-1.1, 0.95-1.05, etc.), the processing device 140 may modify the triangle to an isosceles triangle. As another example, if a ratio of one side to any one of the other sides of the triangle is within a certain range (e.g., 0.9-1.1, 0.92-10.5, etc.), the processing device 140 may modify the triangle to an equilateral triangle. As a further example, if an angle between any two sides of the triangle is between a certain angle range (e.g., 85°-95°, 88°-92°, etc.), the processing device 140 may modify the triangle to a right-angled triangle.

In some embodiments, for a specific hand-drawn graphic of the quadrilateral type, the specific hand-drawn graphic may be a trapezoid, a parallelogram (including a square, a rectangle, and a rhombus), etc. When the hand-drawn graphic is determined to be a quadrilateral (i.e., the shape type of the hand-drawn graphic is the quadrilateral type), the processing device 140 may further modify the quadrilateral based on one or more modification features associated with the quadrilateral type. The modification feature(s) associated with the quadrilateral type may include an angle difference between any two opposite sides of the quadrilateral and a reference axis, a count of pairs of sides that are parallel, an angle between any two adjacent sides of the quadrilateral, a ratio of lengths of any two adjacent sides of the quadrilateral, etc. For example, if an angle difference between any two sides of the quadrilateral and a reference axis (e.g., the horizontal axis or the x-axis) is less than a certain angle (e.g., 10°, 5°, 3°, etc.), the processing device 140 may determine that the two sides are parallel to each other. If the quadrilateral has one pair of parallel sides, the processing device 140 may modify the quadrilateral to a trapezoid. If the quadrilateral has two pairs of parallel sides, the processing device 140 may modify the quadrilateral to a parallelogram. As another example, if an angle between any two adjacent sides of the parallelogram is in a certain angle range (e.g., 85°-95°, 88°-92°, etc.), the processing device 140 may modify the parallelogram to a rectangle. Further, if a ratio of any two adjacent sides of the rectangle is within a certain ratio range (e.g., 0.85-1.15, 0.95-1.05, etc.), the processing device 140 may modify the rectangle to a square. As a further example, if a ratio of any two adjacent sides of the parallelogram is within a certain ratio range (e.g., 0.85-1.15, 0.95-1.05, etc.), the processing device 140 may modify the parallelogram to a rhombus.

The processing device 140 may display the modified hand-drawn graphic on the drawing region of the smart device.

It should be noted that the above descriptions are merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 5:
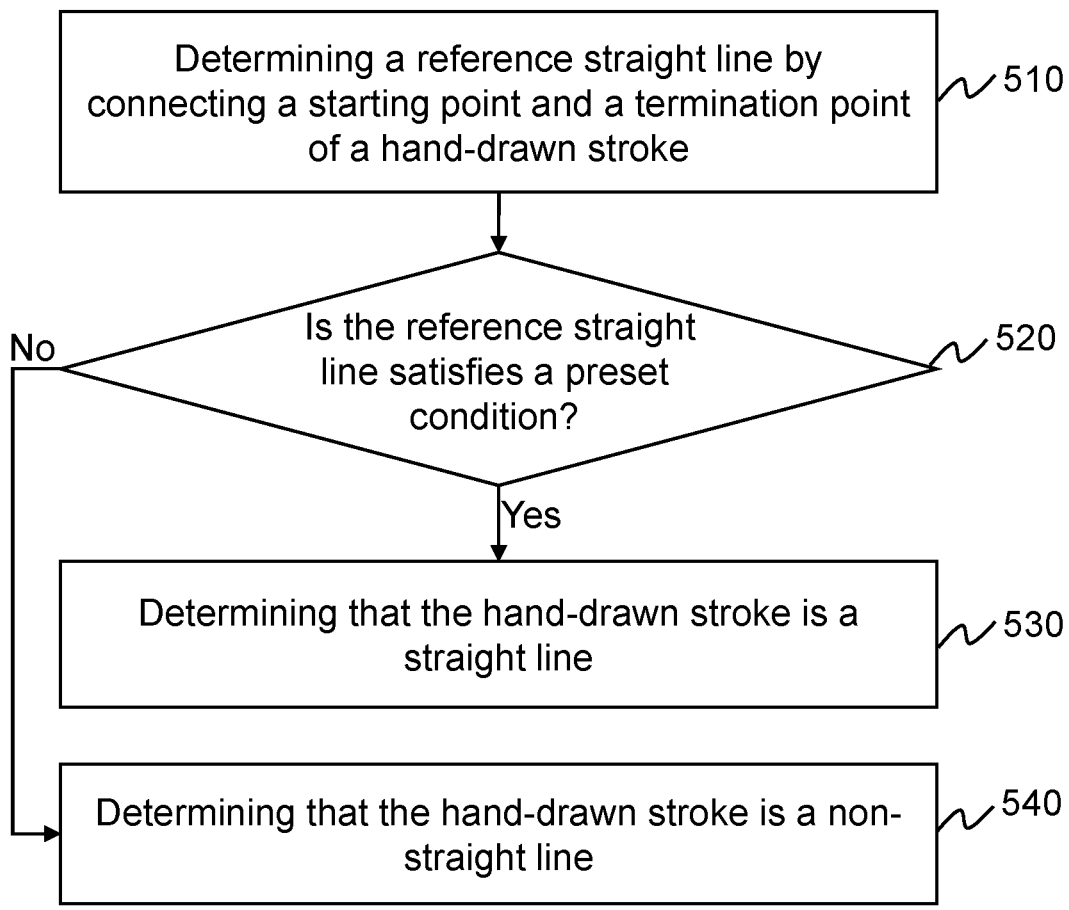
FIG. 5 is a flowchart illustrating an exemplary process for determining a hand-drawn graphic according to some embodiments of the present disclosure.

FIG. 5 is a flowchart illustrating an exemplary process for determining a hand-drawn graphic according to some embodiments of the present disclosure. In some embodiments, a process 500 may be implemented as a set of instructions (e.g., an application) stored in the storage device 150. The processing device 140 may execute the set of instructions, and when executing the instructions, the processing device 140 may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process 500 illustrated in FIG. 5 and described below is not intended to be limiting. In some embodiments, the modified straight line determined based on the stroke segment described in connection with operation 430 in FIG. 4 may be obtained according to the process 500.

In 510, the processing device 140 (e.g., the determination module 220) may determine a reference straight line by connecting a starting point and a termination point of a hand-drawn stroke (or a stroke segment).

In 520, the processing device 140 (e.g., the determination module 220) may determine whether the reference straight line satisfies a condition. In response to a determination that the reference straight line satisfies the condition, the processing device 140 may determine that the hand-drawn stroke is a straight line in operation 530. In response to a determination that the reference straight line does not satisfy the condition, the processing device 140 may determine that the hand-drawn stroke is a non-straight line in operation 540. In some embodiments, the condition may include that a distance from at least one track point other than the starting point and the termination point of the hand-drawn stroke (or the stroke segment) to the reference straight line is less than a first distance threshold (e.g., 0.2 cm, 0.5 cm, 1 cm, 2 cm, etc.), and a ratio of a length of the reference straight line to a sum of distances between every two adjacent track points of the hand-drawn stroke is greater than a second ratio threshold (e.g., 0.85, 0.9, 0.95, etc.).

In some embodiments, the processing device 140 may determine whether the hand-drawn stroke (or the stroke segment) is a straight line based on any three track points of the hand-drawn stroke (or the stroke segment). For example, the processing device 140 may determine three track points A, B, and C, wherein track point A is close to the starting point of the hand-drawn stroke, track point C is close to the termination point of the hand-drawn stroke, and track point B is between track point A and track point C. The processing device 140 may determine a sum of a distance between track point A and track point B and a distance between track point B and track point C. The processing device 140 may determine that the hand-drawn stroke is a straight line if a ratio of a distance between track point A and track point C to the sum of the distance between track point A and track point B and the distance between track point B and track point C is equal to or less than a third ratio threshold (e.g., 0.9, 0.95, etc.).

In some embodiments, in response to a determination that the hand-drawn stroke (or the stroke segment) is the straight line, the processing device 140 may modify the hand-drawn stroke by performing a fitting operation on the hand-drawn stroke. The processing device 140 may display the modified straight line on the drawing region. Specifically, the processing device 140 may construct a second function based on a sum of squares of distances from track points of the hand-drawn stroke (or the stroke segment) to a straight line corresponding to a straight line equation. The processing device 140 may determine a second partial derivative result by determining a partial derivative of the second function with respect to each of one or more line parameters. The processing device 140 may determine the one or more line parameters by solving the second partial derivative results. The processing device 140 may modify a hand-drawn graphic corresponding to the hand-drawn stroke based on the one or more line parameters. For example, the processing device 140 may update the hand-drawn graphic with the straight line corresponding to the straight line equation.

In some embodiments, the processing device 140 may construct a standard straight line function of a straight line as Equation (10) as follows:

$$y = ax + b, \tag{10}$$

where a denotes a slope of the straight line; and b denotes an intercept of the straight line. a and b are the line parameters of the straight line. According to Equation (10), the i-th distance di from the i-th track point $(x_i, y_i)$ of the hand-drawn stroke to a straight line corresponding to the standard straight line function may be determined according to Equation (11), and the second function (also referred to as a second objective function) may be determined as Equation (12) as follows:

$$d_i = \frac{|ax_i - y_i + b|}{\sqrt{a^2 + 1}}, \tag{11}$$

$$J = \sum_{i=0}^{n} d_i^2. \tag{12}$$

In some embodiments, the processing device 140 may determine a partial derivative of the second function with respect to each line parameter to obtain a second partial derivative result. For example, the processing device 140 may determine partial derivatives $$\frac{\partial J}{\partial a}$$

and

-continued
$$\frac{\partial J}{\partial b}$$

of the second function J with respect to the line parameters a and b, respectively. Two second partial derivative results (also referred to as second partial derivative equations) may be determined by assuming $$\frac{\partial J}{\partial a} = 0$$

and $$\frac{\partial J}{\partial b} = 0.$$

Then the processing device 140 may determine the line parameters a and b by solving the two second partial derivative results, thereby determining the standard straight line equation of the straight line. The processing device 140 may display a modified straight line corresponding to the standard straight line equation on a drawing region of a smart device.

In some embodiments, in response to the determination that the hand-drawn graphic is the non-straight line, the processing device 140 may further determine whether the hand-drawn stroke is an ellipse as described in FIG. 4 and the descriptions thereof. In some embodiments, in response to the determination that the hand-drawn graphic is the non-straight line, the processing device 140 may further modify the hand-drawn graphic corresponding to the hand-drawn stroke. Specifically, the processing device 140 may determine whether the hand-drawn graphic corresponding to the hand-drawn stroke is a specific shape. In response to a determination that the hand-drawn graphic is the specific shape, the processing device 140 may perform the fitting operation on the hand-drawn stroke based on the shape to determine a standard hand-drawn graphic. For example, in response to a determination that the hand-drawn graphic is the non-straight line, the processing device 140 may determine whether the hand-drawn stroke is an arc. In response to a determination that the hand-drawn stroke is the arc, the processing device 140 may perform the fitting operation on the hand-drawn stroke to obtain a standard arc. Then the processing device 140 may update the hand-drawn graphic corresponding to the hand-drawn stroke with the standard arc. As another example, in response to a determination that the hand-drawn graphic is the non-straight line, the processing device 140 may determine whether the hand-drawn stroke is a sine wave. In response to a determination that the hand-drawn stroke is the sine wave, the processing device 140 may perform the fitting operation on the hand-drawn stroke to obtain a standard sine wave. Then the processing device 140 may update the hand-drawn graphic corresponding to the hand-drawn stroke with the standard sine wave.

In some embodiments, in response to the determination that the hand-drawn graphic is the non-straight line, the processing device 140 may directly determine the hand-drawn stroke as the hand-drawn graphic corresponding to the hand-drawn stroke.

It should be noted that the above descriptions are merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

FIG. 6 is a schematic diagram illustrating a convex hull according to some embodiments of the present disclosure. As shown in FIG. 6, a hand-drawn graphic 600 may include track points 1~7. The outermost track points of the hand-drawn graphic 600 may include track points 1, 2, 4, 5, and 7. The processing device 140 may connect the outermost track points 1, 2, 4, 5, and 7 to form a convex polygon 610. The convex polygon 610 may be a convex hull corresponding to the hand-drawn graphic 600 or the hand-drawn strokes of the hand-drawn graphic 600.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer readable program code embodied thereon.

A non-transitory computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C #, VB. NET, Python or the like, conventional procedural programming languages, such as the "C" programming language, Visual Basic, Fortran, Perl, COBOL, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (Saas).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system, comprising:
    at least one storage device storing executable instructions for hand-drawn graphic determination, and
    at least one processor in communication with the at least one storage device, wherein when executing the executable instructions, the at least one processor is directed to cause the system to perform operations including:
        obtaining, through a user interface implemented on a smart drawing board, one or more hand-drawn strokes inputted by a user and represented in a drawing region of the user interface;
        in response to determining that an input termination condition is satisfied, determining a hand-drawn graphic corresponding to the one or more hand-drawn strokes, wherein
        the determining the hand-drawn graphic corresponding to the one or more hand-drawn strokes includes:
            determining, based on the one or more hand-drawn strokes, a first graphic and a first area of the first graphic;
            determining, based on the first graphic, a second graphic and a second area of the second graphic;
            determining whether a ratio of the second area to the first area is less than a first ratio threshold; and
            in response to determining that the ratio is less than the first ratio threshold, determining that the hand-drawn graphic is an ellipse; or
            in response to determining that the ratio is greater than the first ratio threshold, determining that the hand-drawn graphic is a non-ellipse.

2. The system of claim 1, wherein to determine that the input termination condition is satisfied, the at least one processor is further configured to cause the system to perform operations including:
    obtaining an input interval time after drawing a current hand-drawn stroke; and
    determining that the input termination condition is satisfied when the input interval time exceeds an interval time threshold.

3. The system of claim 1, wherein the one or more hand-drawn strokes include one hand-drawn stroke, to determine that the input termination condition is satisfied, the at least one processor is further configured to cause the system to perform operations including:
  determining a minimum distance between a starting point and a termination point of the hand-drawn stroke; and
  determining that the input termination condition is satisfied when the minimum distance is less than a second distance threshold.

4. The system of claim 3, wherein to determine the second distance threshold, the at least one processor is further configured to cause the system to perform operations including:
  obtaining an area of a convex hull corresponding to track points of hand-drawn strokes that have been drawn; and
  determining, based on the area of the convex hull, the second distance threshold.

5. The system of claim 1, wherein the one or more hand-drawn strokes include at least two hand-drawn strokes, to determine that the input termination condition is satisfied, the at least one processor is further configured to cause the system to perform operations including:
  determining a maximum distance among distances between every two adjacent end points of end points of the at least two hand-drawn strokes; and
  determining that the input termination condition is satisfied when the maximum distance is less than a second distance threshold.

6. The system of claim 1, wherein the first graphic includes a convex hull, and the second graphic includes a maximum inscribed quadrilateral of the convex hull.

7. The system of claim 1, wherein when the hand-drawn graphic is the ellipse, a count of the one or more hand-drawn strokes is one or two.

8. The system of claim 1, wherein each hand-drawn stroke includes a plurality of track points, and in response to determining that the hand-drawn graphic is the ellipse, the at least one processor is further configured to cause the system to perform operations including:
  constructing a first function based on a sum of squares of distances from track points of the ellipse to an ellipse corresponding to an ellipse equation;
  determining a first partial derivative result by determining a partial derivative of the first function with respect to each of one or more ellipse parameters of the ellipse; and
  determining the one or more ellipse parameters of the ellipse by solving the first partial derivative results.

9. The system of claim 1, wherein in response to determining that the hand-drawn graphic is the non-ellipse, the at least one processor is further configured to cause the system to perform operations including:
  determining whether the one or more hand-drawn strokes include a polyline stroke; and
  in response to determining that the one or more hand-drawn strokes include the polyline stroke, segmenting the polyline stroke into multiple stroke segments, each of the multiple stroke segments corresponding to a modified straight line.

10. The system of claim 9, wherein the segmenting the polyline stroke into multiple stroke segments includes:
  extracting one or more inflection points of the polyline stroke; and
  segmenting, based on the one or more inflection points, the polyline stroke.

11. The system of claim 10, wherein the extracting one or more inflection points of the polyline stroke includes:
  for each track point of the polyline stroke,
    calculating a curvature corresponding to the track point of the polyline stroke; and
    designating the track point as the inflection point when the curvature is greater than a curvature threshold.

12. The system of claim 10, wherein before segmenting, based on the one or more inflection points, the polyline stroke, the at least one processor is further configured to cause the system to perform operations including at least one of:
  deleting a first count of inflection points close to a starting point of the polyline stroke;
  deleting a second count of inflection points close to a termination point of the polyline stroke; or
  deleting a current inflection point when a count of track points between the current inflection point and a next inflection point is less than a threshold.

13. The system of claim 1, wherein before determining whether the hand-drawn graphic is an ellipse, the at least one processor is further configured to cause the system to perform operations including:
  for each of the one or more hand-drawn strokes,
    determining a reference straight line by connecting a starting point and a termination point of the hand-drawn stroke;
    determining whether the reference straight line satisfies a condition, wherein the condition includes that a distance from at least one track point other than the starting point and the termination point of the hand-drawn stroke to the reference straight line is less than a first distance threshold, and a ratio of a length of the reference straight line to a sum of distances between every two adjacent track points of the hand-drawn stroke is greater than a second ratio threshold; and
    in response to determining that the reference straight line satisfies the condition, determining that the hand-drawn stroke is a straight line; or
    in response to determining that the reference straight line does not satisfy the condition, determining that the hand-drawn stroke is a non-straight line.

14. The system of claim 13, wherein each hand-drawn stroke includes a plurality of track points, and in response to determining that the hand-drawn stroke is a straight line, the at least one processor is further configured to cause the system to perform operations including:
  constructing a second function based on a sum of squares of distances from track points of the straight line to a straight line corresponding to a straight line equation;
  determining a second partial derivative result by determining a partial derivative of the second function with respect to each of one or more line parameters of the straight line; and
  determining the one or more line parameters of the straight line by solving the second partial derivative results.

15. The system of claim 13, wherein in response to determining that each of the one or more hand-drawn strokes is the straight line, the at least one processor is further configured to cause the system to perform operations including:
  determining an intersection point of every two adjacent straight lines; and
  determining the hand-drawn graphic by connecting the intersection points of the one or more straight lines in sequence.

16. The system of claim 15, wherein the at least one processor is further configured to cause the system to perform operations including:
modifying the hand-drawn graphic based on modification features of a shape type of the hand-drawn graphic.

17. A method implemented on a computing device including at least one processor and at least one storage medium, and a communication platform connected to a network, the method comprising:
obtaining, through a user interface implemented on a smart drawing board, one or more hand-drawn strokes inputted by a user and represented in a drawing region of the user interface;
in response to determining that an input termination condition is satisfied, determining a hand-drawn graphic corresponding to the one or more hand-drawn strokes, wherein
the determining the hand-drawn graphic corresponding to the one or more hand-drawn strokes includes:
determining, based on the one or more hand-drawn strokes, a first graphic and a first area of the first graphic;
determining, based on the first graphic, a second graphic and a second area of the second graphic;
determining whether a ratio of the second area to the first area is less than a first ratio threshold; and
in response to determining that the ratio is less than the first ratio threshold, determining that the hand-drawn graphic is an ellipse; or
in response to determining that the ratio is greater than the first ratio threshold, determining that the hand-drawn graphic is a non-ellipse.

18. The method of claim 17, wherein each hand-drawn stroke includes a plurality of track points, and in response to determining that the hand-drawn graphic is the ellipse, the method further comprising:
constructing a first function based on a sum of squares of distances from track points of the ellipse to an ellipse corresponding to an ellipse equation;
determining a first partial derivative result by determining a partial derivative of the first function with respect to each of one or more ellipse parameters of the ellipse; and
determining the one or more ellipse parameters of the ellipse by solving the first partial derivative results.

19. The method of claim 17, wherein in response to determining that the hand-drawn graphic is the non-ellipse, the method further comprising:
determining whether the one or more hand-drawn strokes include a polyline stroke; and
in response to determining that the one or more hand-drawn strokes include the polyline stroke, segmenting the polyline stroke into multiple stroke segments, each of the multiple stroke segments corresponding to a modified straight line.

20. A non-transitory computer readable medium, comprising executable instructions that, when executed by at least one processor, direct the at least one processor to perform a method, the method comprising:
obtaining, through a user interface implemented on a smart drawing board, one or more hand-drawn strokes inputted by a user and represented in a drawing region of the user interface;
in response to determining that an input termination condition is satisfied, determining a hand-drawn graphic corresponding to the one or more hand-drawn strokes, wherein
the determining the hand-drawn graphic corresponding to the one or more hand-drawn strokes includes:
determining, based on the one or more hand-drawn strokes, a first graphic and a first area of the first graphic;
determining, based on the first graphic, a second graphic and a second area of the second graphic;
determining whether a ratio of the second area to the first area is less than a first ratio threshold; and
in response to determining that the ratio is less than the first ratio threshold, determining that the hand-drawn graphic is an ellipse; or
in response to determining that the ratio is greater than the first ratio threshold, determining that the hand-drawn graphic is a non-ellipse.

* * * * *